(12) United States Patent  
Furui

(10) Patent No.: US 8,177,373 B2
(45) Date of Patent: May 15, 2012

(54) PROJECTOR, PROJECTED IMAGE ADJUSTMENT METHOD, AND PROGRAM FOR PROJECTING AN IMAGE WHILE CORRECTING THE SHAPE OF THE IMAGE TO PROJECT AN IMAGE AT A DESIRED ASPECT RATIO

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/180,650

(22) Filed: Jul. 12, 2011

(65) Prior Publication Data

US 2011/0267587 A1 Nov. 3, 2011

Related U.S. Application Data

(63) Continuation of application No. 12/068,659, filed on Feb. 8, 2008, now Pat. No. 8,025,414.

(30) Foreign Application Priority Data

Feb. 23, 2007 (JP) ................................. 2007-044241

(51) Int. Cl.
*G03B 21/14* (2006.01)

(52) U.S. Cl. .............................. 353/69; 353/70; 348/806

(58) Field of Classification Search .................... 353/69, 353/122, 70; 348/806, 807; 345/207
See application file for complete search history.

(56) References Cited

U.S. PATENT DOCUMENTS 7,347,564 B2 * 3/2008 Matsumoto et al. ............ 353/69

| | | | |
|---|---|---|---|
| 8,025,414 B2 * | 9/2011 | Furui | 353/69 |
| 2005/0041216 A1 | 2/2005 | Kobayashi | |
| 2005/0231691 A1 | 10/2005 | Li | |

FOREIGN PATENT DOCUMENTS

| | | |
|---|---|---|
| JP | A-07-270124 | 10/1995 |
| JP | A-08-149552 | 6/1996 |
| JP | A-2008-149522 | 6/1996 |
| JP | A-2000-284363 | 10/2000 |
| JP | A-2002-071315 | 3/2002 |
| JP | A-2002-140058 | 5/2002 |
| JP | A-2004-260785 | 9/2004 |
| JP | A-2004-363665 | 12/2004 |

(Continued)

OTHER PUBLICATIONS

Nov. 26, 2010 Office Action issued in U.S. Appl. No. 12/068,659.

(Continued)

*Primary Examiner* — Francis M Legasse, Jr.
(74) *Attorney, Agent, or Firm* — Oliff & Berridge, PLC

(57) ABSTRACT

A projector includes a projection section which projects a calibration image onto a projection target through a projection panel, a shape determination section which determines a shape of the projection target, a correction target area setting section which sets a correction target area, an aspect ratio calculation section which calculates an aspect ratio of the correction target area, a determination section which determines whether or not a value which indicates a difference between the aspect ratio of the correction target area and a reference aspect ratio satisfies a set condition, and an image generation section which generates an image having the shape of the correction target area on the projection panel when the set condition is satisfied, and generates an image having the reference aspect ratio on the projection panel when the set condition is not satisfied.

13 Claims, 11 Drawing Sheets

FOREIGN PATENT DOCUMENTS

| | | |
|---|---|---|
| JP | A-2005-020314 | 1/2005 |
| JP | A-2005-038388 | 2/2005 |
| JP | A-2005-286572 | 10/2005 |
| JP | A-2006-060447 | 3/2006 |
| JP | A-2006-094558 | 4/2006 |

OTHER PUBLICATIONS

Apr. 12, 2011 Notice of Allowance issued in U.S. Appl. No. 12/068,659.

* cited by examiner

PRIOR ART

PROJECTOR, PROJECTED IMAGE ADJUSTMENT METHOD, AND PROGRAM FOR PROJECTING AN IMAGE WHILE CORRECTING THE SHAPE OF THE IMAGE TO PROJECT AN IMAGE AT A DESIRED ASPECT RATIO

This is a Continuation of application Ser. No. 12/068,659 filed Feb. 8, 2008, which claims the benefit of Japanese Patent Application No. 2007-044241, filed on Feb. 23, 2007, which is hereby incorporated by reference in its entirety.

BACKGROUND OF THE INVENTION

The present invention relates to a projector, a projected image adjustment method, and a program for projecting an image while correcting the shape of the image.

When a projector projects an image onto a screen or the like, the projected image may be distorted. As a method of correcting such distortion of an image, JP-A-2005-286572 proposes a method in which the user adjusts the position of a projected image so that the four corners of the projected image coincide with the four corners of a projection target such as a screen, the aspect ratio of the projection target is calculated based on position adjustment information, and position correction information is generated based on the aspect ratio so that the projected image has a predetermined aspect ratio, for example.

However, when a projector projects an image with an aspect ratio of 4:3 when the aspect ratio of the projection target is about 4:3.1, the image is not projected at the upper end and the lower end of the projection target, whereby the user may have a wrong impression. A non-display area also occurs on the projection target when a sensed image is affected by an error due to optical distortion, noise, resolution limits of a sensing section, and the like, whereby the user may also have a wrong impression.

SUMMARY

According to a first aspect of the invention, there is provided a projector comprising:

a projection section which projects a calibration image onto a projection target through a projection panel;

a shape determination section which determines at least part of a shape of the projection target based on sensing information from a sensing section in a state in which the calibration image is projected onto the projection target or operation information from an operation section in a state in which the calibration image is projected onto the projection target;

a correction target area setting section which sets a correction target area, the correction target area being an area along the shape determined by the shape determination section and being an area on the projection panel;

an aspect ratio calculation section which calculates an aspect ratio of the correction target area;

a determination section which determines whether or not a value which indicates a difference between the aspect ratio of the correction target area and a reference aspect ratio satisfies a set condition; and an image generation section which generates an image having the shape of the correction target area on the projection panel when the set condition is satisfied, and generates an image having the reference aspect ratio on the projection panel when the set condition is not satisfied.

According to a second aspect of the invention, there is provided a projected image adjustment method using a projector, the method comprising causing the projector to:

project a calibration image onto a projection target through a projection panel;

determine a shape of at least part of the projection target based on sensing information from a sensing section in a state in which the calibration image is projected onto the projection target or operation information from an operation section in a state in which the calibration image is projected onto the projection target;

set a correction target area, the correction target area being an area along the determined shape and being an area on the projection panel;

calculate an aspect ratio of the correction target area;

determine whether or not a value which indicates a difference between the aspect ratio of the correction target area and a reference aspect ratio satisfies a set condition;

generate an image having the shape of the correction target area on the projection panel when the set condition is satisfied, and generate an image having the reference aspect ratio on the projection panel when the set condition is not satisfied; and project the image generated on the projection panel.

According to a third aspect of the invention, there is provided a program readable by a computer included in a projector including a projection section, the program causing the computer to function as:

a projection control section which causes a projection section to project a calibration image onto a projection target through a projection panel;

a shape determination section which determines at least part of a shape of the projection target based on sensing information from a sensing section in a state in which the calibration image is projected onto the projection target or operation information from an operation section in a state in which the calibration image is projected onto the projection target;

a correction target area setting section which sets a correction target area, the correction target area being an area along the shape determined by the shape determination section and being an area on the projection panel;

an aspect ratio calculation section which calculates an aspect ratio of the correction target area;

a determination section which determines whether or not a value which indicates a difference between the aspect ratio of the correction target area and a reference aspect ratio satisfies a set condition; and an image generation section which generates an image having the shape of the correction target area on the projection panel when the set condition is satisfied, and generates an image having the reference aspect ratio on the projection panel when the set condition is not satisfied.

DETAILED DESCRIPTION OF THE EMBODIMENT

Figure 1:
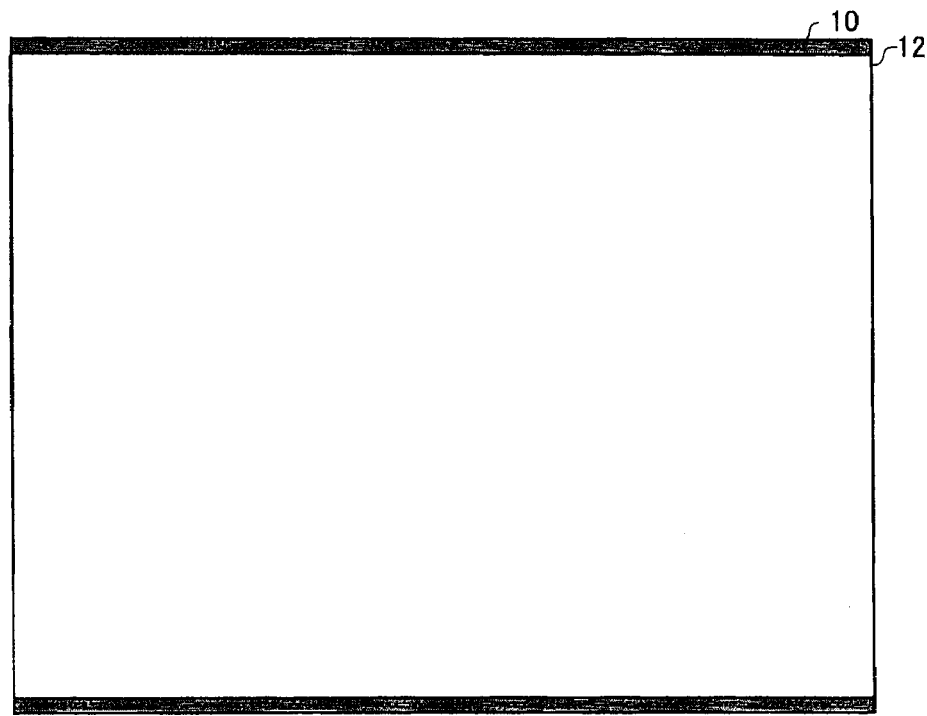
FIG. 1 is a diagram showing a projected image according to related art.

The invention may provide a projector, a projected image adjustment method, and a program capable of projecting an image at an aspect ratio corresponding to the situation.

According to one embodiment of the invention, there is provided a projector comprising:

a projection section which projects a calibration image onto a projection target through a projection panel;

a shape determination section which determines at least part of a shape of the projection target based on sensing information from a sensing section in a state in which the calibration image is projected onto the projection target or operation information from an operation section in a state in which the calibration image is projected onto the projection target;

a correction target area setting section which sets a correction target area, the correction target area being an area along the shape determined by the shape determination section and being an area on the projection panel;

an aspect ratio calculation section which calculates an aspect ratio of the correction target area;

a determination section which determines whether or not a value which indicates a difference between the aspect ratio of the correction target area and a reference aspect ratio satisfies a set condition; and an image generation section which generates an image having the shape of the correction target area on the projection panel when the set condition is satisfied, and generates an image having the reference aspect ratio on the projection panel when the set condition is not satisfied.

According to one embodiment of the invention, there is provided a projected image adjustment method using a projector, the method comprising causing the projector to:

project a calibration image onto a projection target through a projection panel;

determine a shape of at least part of the projection target based on sensing information from a sensing section in a state in which the calibration image is projected onto the projection target or operation information from an operation section in a state in which the calibration image is projected onto the projection target;

set a correction target area, the correction target area being an area along the determined shape and being an area on the projection panel;

calculate an aspect ratio of the correction target area;

determine whether or not a value which indicates a difference between the aspect ratio of the correction target area and a reference aspect ratio satisfies a set condition;

generate an image having the shape of the correction target area on the projection panel when the set condition is satisfied, and generate an image having the reference aspect ratio on the projection panel when the set condition is not satisfied; and project the image generated on the projection panel.

According to one embodiment of the invention, there is provided a program readable by a computer included in a projector including a projection section, the program causing the computer to function as:

a projection control section which causes a projection section to project a calibration image onto a projection target through a projection panel;

a shape determination section which determines at least part of a shape of the projection target based on sensing information from a sensing section in a state in which the calibration image is projected onto the projection target or operation information from an operation section in a state in which the calibration image is projected onto the projection target;

a correction target area setting section which sets a correction target area, the correction target area being an area along the shape determined by the shape determination section and being an area on the projection panel;

an aspect ratio calculation section which calculates an aspect ratio of the correction target area;

a determination section which determines whether or not a value which indicates a difference between the aspect ratio of the correction target area and a reference aspect ratio satisfies a set condition; and an image generation section which generates an image having the shape of the correction target area on the projection panel when the set condition is satisfied, and generates an image having the reference aspect ratio on the projection panel when the set condition is not satisfied.

According to one embodiment of the invention, there is provided an information storage medium storing the program which is readable by a computer included in a projector having a projection section.

According to the above embodiment, the projector can project an image at an aspect ratio corresponding to the situation by determining the value which indicates the difference between the aspect ratio of the correction target area and the reference aspect ratio satisfies the set condition, and projecting an image at an aspect ratio corresponding to the determination result.

The sensing section may sense an area including at least part of the calibration image projected by the projection section and at least part of the projection target to generate the sensing information which indicates a sensed image; and the shape determination section may determine the shape of at least part of the projection target included in the sensed image based on the sensing information.

The projector may sense an area including at least part of the calibration image projected by the projection section and at least part of the projection target to generate sensing information which indicates a sensed image, and determine at least part of the shape of the projection target included in the sensed image based on the sensing information.

Since the projector can thus determine the shape of at least part of the projection target based on the sensing information, the projector can project an image at a desired aspect ratio without inputting operation information.

When the shape of the entire projection target has not been determined by the shape determination section, the correction target area setting section may determine coordinate values of a vertical vanishing point and a horizontal vanishing point formed by sides of the projection target in a coordinate system of the projection panel based on the sensing information, and supplement a portion of the projection target which has not determined by the shape determination section based on the coordinate values.

When the shape of the entire projection target has not been determined, the projector may determine coordinate values of a vertical vanishing point and a horizontal vanishing point formed by sides of the projection target in a coordinate system of the projection panel based on the sensing information, and supplement a portion of the projection target which has not determined based on the coordinate values.

Since the projector can thus supplement the undetermined portion of the projection target even if the entire projection target is not included in the sensed image, the projector can more generally project an image at an aspect ratio corresponding to the situation.

The determination section may determine whether or not the set condition is satisfied by determining whether or not the value which indicates the difference between the aspect ratio of the correction target area and the reference aspect ratio is within a predetermined range.

The projector may determine whether or not the set condition is satisfied by determining whether or not the value which indicates the difference between the aspect ratio of the correction target area and the reference aspect ratio is within a predetermined range.

Since the projector can thus absorb a measurement error and the like by determining the difference in aspect ratio utilizing the range, a situation in which a non-display area occurs on the projection target can be prevented.

When the shape of the entire projection target has not been determined by the shape determination section, the determination section may reduce the predetermined range as compared with the case where the shape of the entire projection target has been determined by the shape determination section.

When the entire shape of the projection target has not been determined, the projector may reduce the predetermined range as compared with the case where the entire shape of the projection target has been determined.

The projector thus can more strictly deal with the case where distortion of an image occurs to a large extent, for example, whereby a situation in which an image having a wrong shape is projected can be prevented.

The correction target area setting section may set an area larger than the shape determined by the shape determination section by at least one pixel as the correction target area.

The projector may set an area larger than the determined shape by at least one pixel as the correction target area.

Since the projector thus sets an area larger than the determined shape by at least one pixel as the correction target area, a situation in which a non-display area occurs on the projection target can be prevented.

The invention is described below with reference to the drawings taking the case of applying the invention to a projector as an example. Note that the embodiments described hereunder do not in any way limit the scope of the invention defined by the claims laid out herein. Note also that not all of the elements of the embodiments should be taken as essential requirements to the invention.

Problems of Related Art

FIG. 1 is a diagram showing a projected image 12 according to related art. A related-art projector projects an image with an aspect ratio of 4:3 based on the setting even if the aspect ratio of a screen 10 (one type of projection target) is about 4:3.1. Therefore, the image is not projected at the upper end and the lower end of the screen 10, as shown in FIG. 1, whereby the user may have a wrong impression. A related-art projector corrects distortion of an image based on a sensed image. When the sensed image is affected by an error due to optical distortion, noise, resolution limits of a sensing section, and the like, a non-display area occurs on the screen 10, whereby the user may also have a wrong impression.

Figure 2:
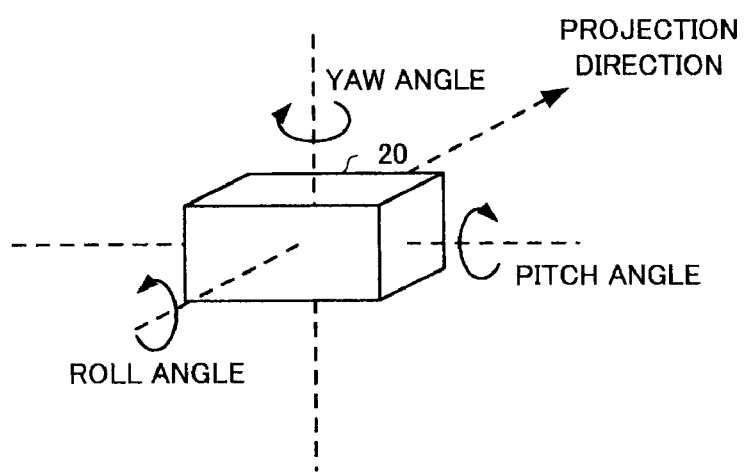
FIG. 2 is a diagram showing a roll angle of a projector.

FIG. 2 is a diagram showing the roll angle of a projector 20. The related-art projector 20 corrects distortion of an image depending on the projection angle in the vertical direction (pitch angle) and the projection angle in the horizontal direction (yaw angle). Since the projector 20 does not utilize the rotation angle (roll angle) of the projector 20 with respect to the optical axis of projection light, distortion of an image cannot be accurately corrected when a table or the like on which the projector 20 is placed inclines.

Figure 3:
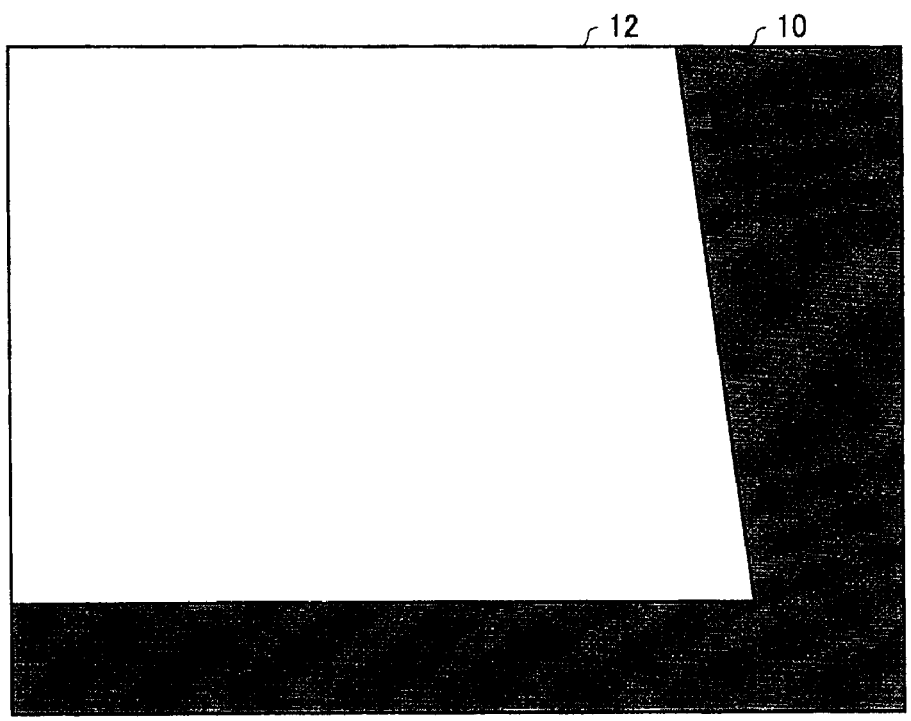
FIG. 3 is a diagram showing a projected image after distortion correction according to related art.

FIG. 3 is a diagram showing the projected image 12 after distortion correction according to related art. The related-art projector 20 performs a number of calculations using the coordinate values of the sensing area (e.g., CCD panel) of the sensing section (e.g., CCD sensor). Therefore, even if the position of the sensing section provided in the projector 20 differs from the original position to only a small extent, the projected image 12 after distortion correction according to related art is distorted as shown in FIG. 3.

First Embodiment

In order to solve these problems, a projector according to this embodiment has a function of projecting an image at an aspect ratio corresponding to the situation by determining a value which indicates the difference between the aspect ratio of a correction target area and a reference aspect ratio satisfies a set condition, and projecting an image at an aspect ratio corresponding to the determination result. The projector according to this embodiment has a function of correcting distortion of an image using the roll angle. The projector according to this embodiment also has a function of performing calculations relating to the coordinate value of an image using the coordinate system of a projection panel.

Figure 4:
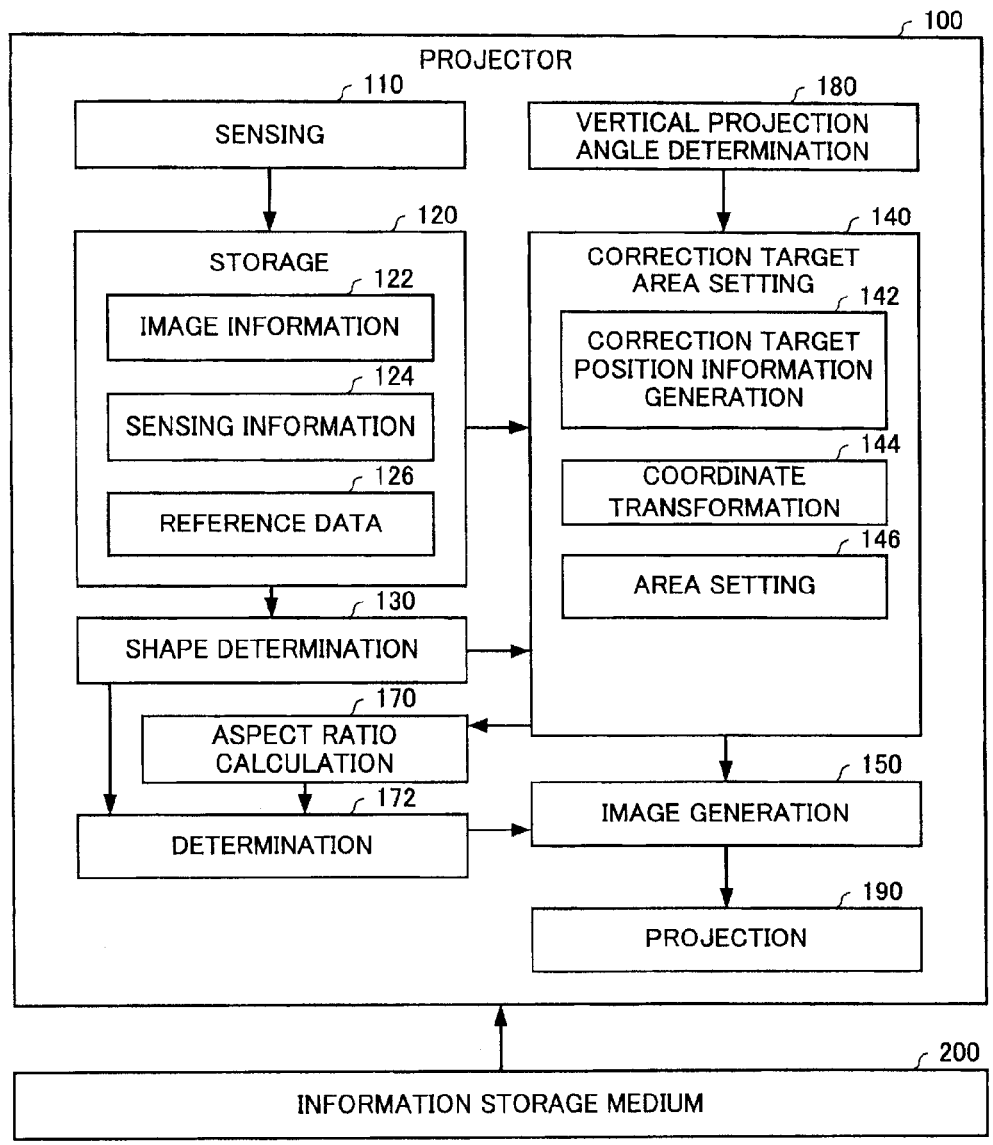
FIG. 4 is a functional block diagram of a projector according to a first embodiment of the invention.

Functional blocks of a projector 100 having these functions are described below. FIG. 4 is a functional block diagram of the projector 100 according to a first embodiment. The projector 100 is configured to include a sensing section 110 which senses a calibration image projected onto a screen 10 to generate sensing information which indicates the sensed image, a storage section 120 which stores various types of data, and a shape determination section 130 which determines the shape of at least part of the screen 10 based on the sensing information.

The storage section 120 stores image information 122 for generating an image, sensing information 124 from the sensing section 110, and reference data 126 which indicates a reference aspect ratio, a determination reference value, and the like, for example.

The projector 100 is configured to include a correction target area setting section 140 which sets a correction target area, an image generation section 150 which generates an image in the correction target area of a liquid crystal panel which is one type of projection panel, a projection section 190 which projects the image, an aspect ratio calculation section 170 which calculates the aspect ratio of the correction target area, a determination section 172 which makes various determinations, and a vertical projection angle determination section 180 which determines the vertical projection angle of the projector 100.

The correction target area setting section 140 is configured to include a correction target position information generation section 142 which generates correction target position information based on the information from the shape determination section 130, a coordinate transformation section 144 which transforms the coordinate value of the sensing area into the coordinate value of the liquid crystal panel, and an area setting section 146 which sets the correction target area based on the coordinate value.

As hardware of the projector 100 which implements the function of each section, the following hardware may be used, for example. For example, a CCD sensor or the like may be used as the sensing section 110. A RAM, an HDD, or the like may be used as the storage section 120. A CPU or the like may be used as the shape determination section 130, the correction target area setting section 140, the aspect ratio calculation section 170, and the determination section 172. An image processing circuit, a liquid crystal driver circuit, or the like may be used as the image generation section 150. An angle sensor or the like may be used as the vertical projection angle determination section 180. A liquid crystal panel, a lamp, a projection lens, and the like may be used as the projection section 190.

The function of each section may be implemented by causing the projector 100 to read a program which implements the function of each section from an information storage medium 200 which stores the program. As the information storage medium 200, a CD-ROM, a DVD-ROM, a ROM, a RAM, an HDD, or the like may be applied. The program reading method may be a contact method or a noncontact method.

Figure 5:
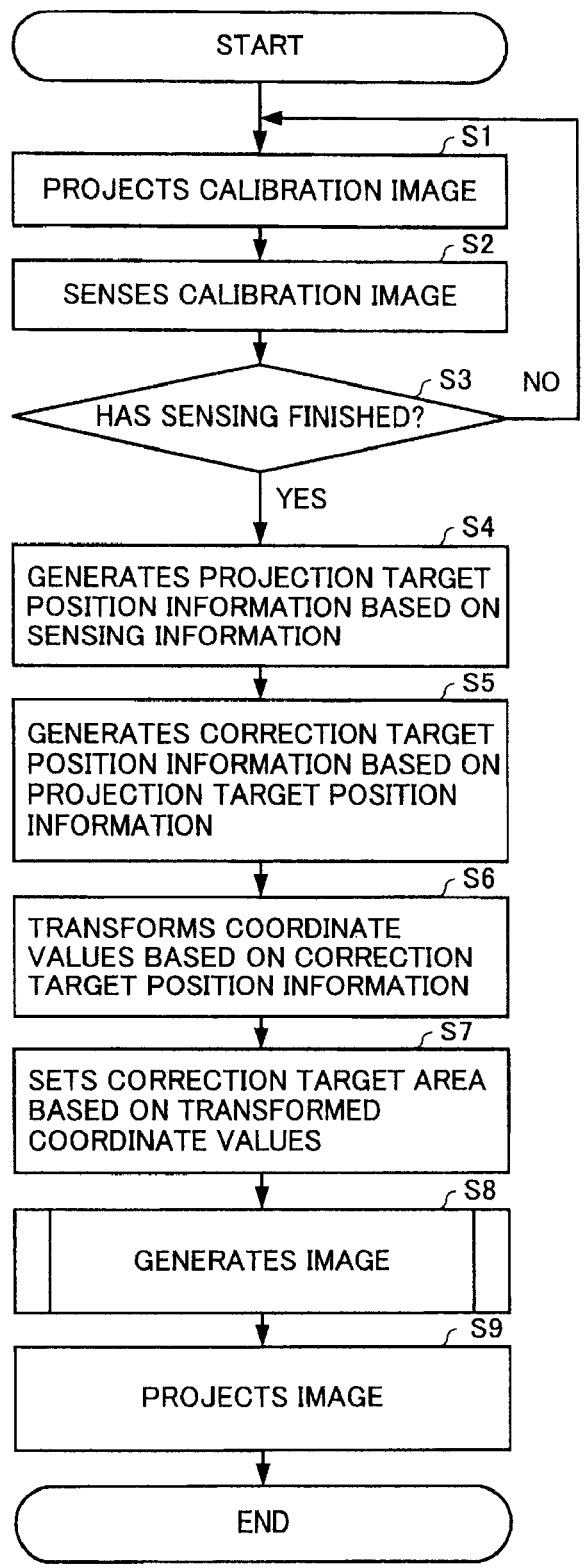
FIG. 5 is a flowchart showing a projection process according to the first embodiment of the invention.

A projection process using each section is as follows. FIG. 5 is a flowchart showing the projection process according to the first embodiment. For example, the projector 100 corrects distortion of an image when the projector 100 has been activated, when the user has directed correction, or the like. When the projector 100 corrects distortion of an image, the image generation section 150 generates a calibration image based on the image information 122, and the projection section 190 projects the calibration image onto the screen 10 (step S1).

The sensing section 110 senses the calibration image projected onto the screen 10 to generate the sensing information 124, and stores the sensing information 124 in the storage section 120 (step S2). In this embodiment, the projector 100 projects and senses three types of calibration images.

Figure 6A:
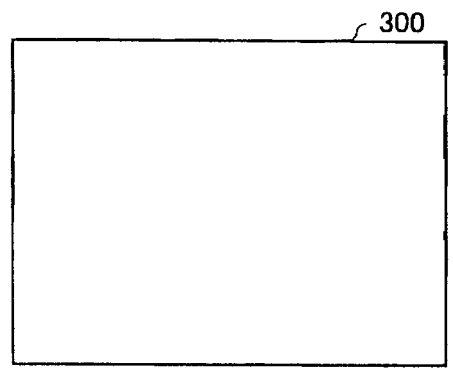
FIG. 6A is a diagram showing a solid white calibration image.
Figure 6B:
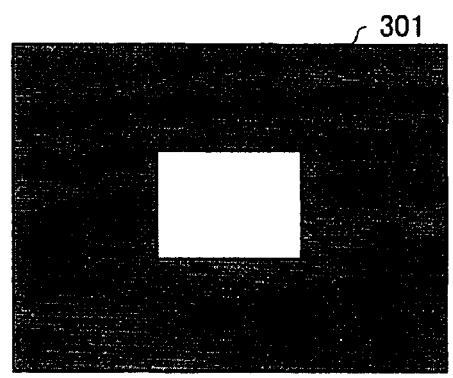
FIG. 6B is a diagram showing a center-white calibration image.
Figure 6C:
FIG. 6C is a diagram showing a solid black calibration image.

FIG. 6A is a diagram showing a solid white calibration image 300, FIG. 6B is a diagram showing a center-white calibration image 301, and FIG. 6C is a diagram showing a solid black calibration image 302. The projector 20 projects the solid white (i.e., the entire image is white) calibration image 300, and senses the projected calibration image 300 by automatic exposure.

The projector 100 then projects the calibration image 301 in which a center area having a shape proportional to that of the entire image (e.g., an area which is ⅛th of the entire image and is positioned at the center of the image) is white and an area other than the center area is black, and senses the projected calibration image 301 at an exposure determined by automatic exposure when sensing the calibration image 300. The projector 20 then projects the solid black (i.e., the entire image is black) calibration image 302, and senses the projected calibration image 302 at an exposure determined by automatic exposure when sensing the calibration image 300.

Figure 7A:
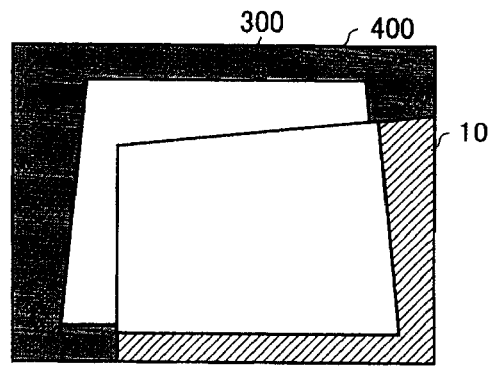
FIG. 7A is a diagram showing a sensed image of a solid white calibration image.
Figure 7B:
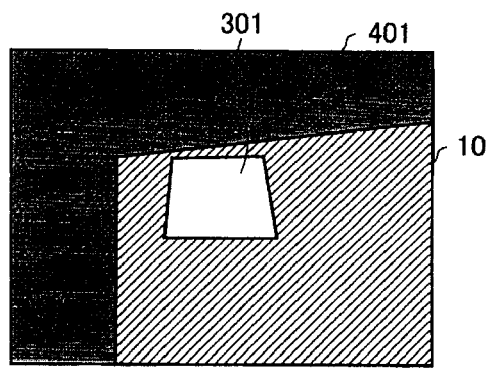
FIG. 7B is a diagram showing a sensed image of a center-white calibration image.
Figure 7C:
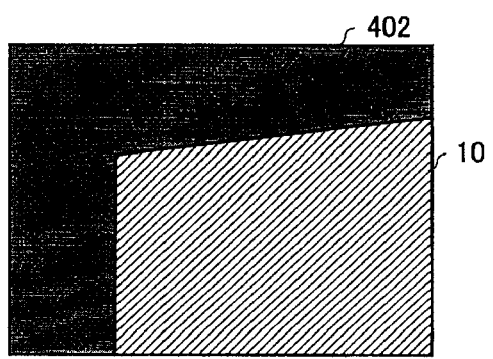
FIG. 7C is a diagram showing a sensed image of a solid black calibration image.

FIG. 7A is a diagram showing a sensed image 400 of the solid white calibration image 300, FIG. 7B is a diagram showing a sensed image 401 of the center-white calibration image 301, and FIG. 7C is a diagram showing a sensed image 402 of the solid black calibration image 302.

For example, even if the calibration image 300 is partially positioned outside the screen 10, as shown in FIG. 7A, the center area of the calibration image 301 is projected onto the screen 10, as shown in FIG. 7B. Therefore, the projector 100 can determine the luminance value, shape, and the like of the solid white image on the screen 10. Note that the three types of calibration images 300 to 302 may be sensed in an arbitrary order.

The shape determination section 130 determines whether or not the sensing section 110 has sensed the three types of calibration images 300 to 302 (step S3). When the shape determination section 130 has determined that the sensing section 110 has sensed the three types of calibration images 300 to 302, the shape determination section 130 generates projection target position information which indicates the position of the screen 10 in the sensing area based on the sensing information 124 (step S4). Specifically, the shape determination section 130 generates a differential image between the sensed image 400 and the sensed image 402, determines the boundary line between the screen 10 and the background in the sensing area by performing edge detection and the like on the differential image, and generates the projection target position information relating to the position of the boundary line. The differential image is used in order to eliminate the effects of noise which occurs when light from a fluorescent lamp and the like is reflected in the sensed image 400 and the like.

Figure 8:
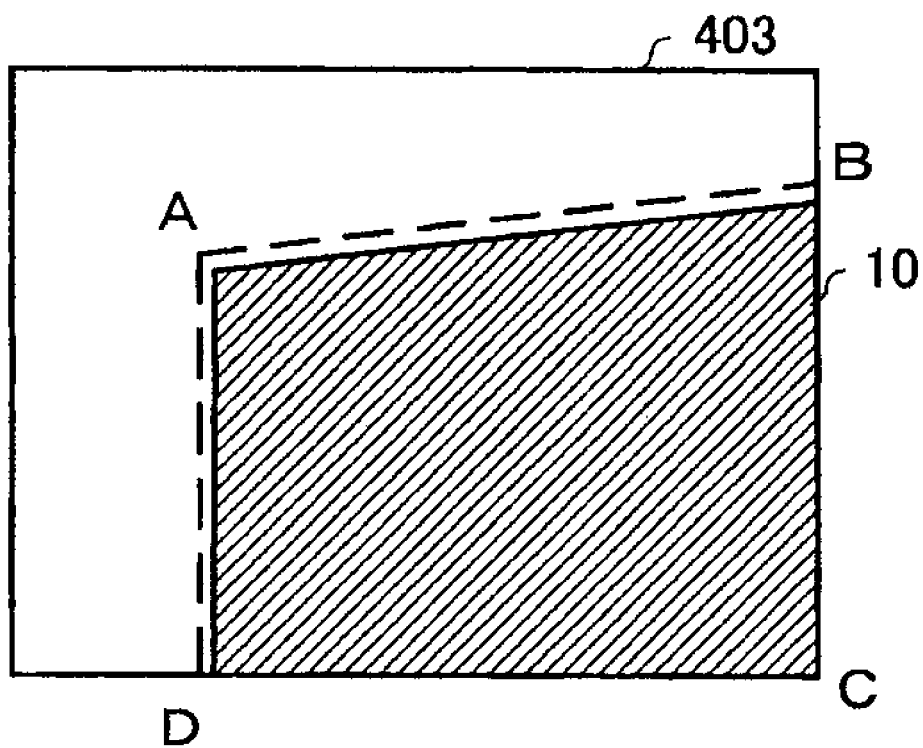
FIG. 8 is a diagram showing an example of a screen in a sensed image after correction.

The correction target position information generation section 142 generates correction target position information based on the projection target position information from the shape determination section 130 (step S5). FIG. 8 is a diagram showing of an example of the screen 10 in the sensed image 403 after correction. For example, the correction target position information generation section 142 sets an area ABCD (area indicated by a broken line in FIG. 8) generated by enlarging the screen 10 in the sensed image 403 by one pixel, and generates the correction target position information relating to the position of the area ABCD (e.g., information which indicates the coordinate values of the four corners of the area ABCD in the sensing area).

The coordinate transformation section 144 transforms the coordinate values of the area ABCD in the sensing area into coordinate values on the liquid crystal panel based on the correction target position information from the correction target position information generation section 142 (step S6). The coordinate values are transformed by projective transformation and the like.

Figure 9:
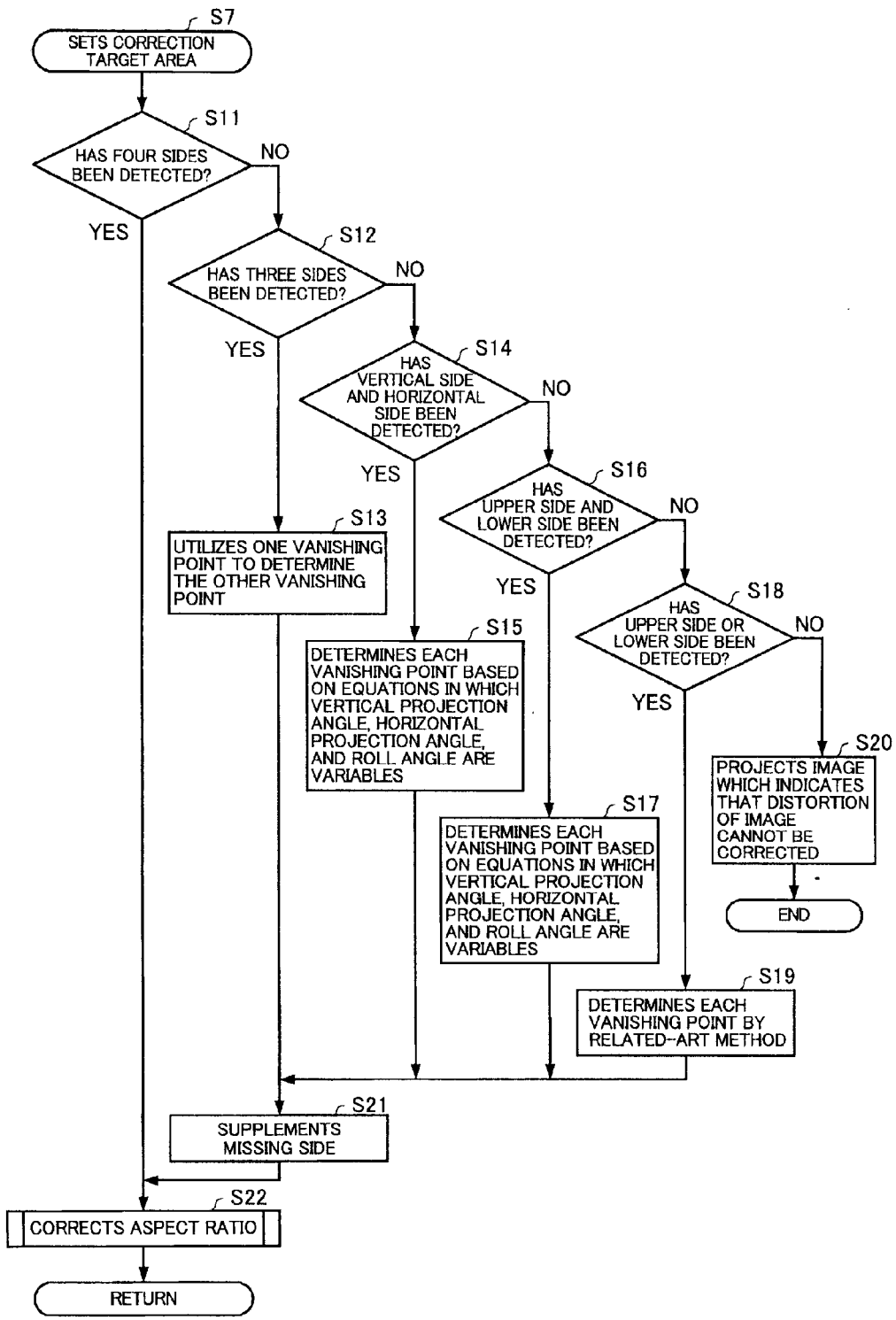
FIG. 9 is a flowchart showing a correction target area setting process according to the first embodiment of the invention.

The area setting section 146 sets the correction target area based on the coordinate values after transformation by the coordinate conversion section 144 (step S7). The correction target area setting is described below in detail. FIG. 9 is a flowchart showing the correction target area setting process according to the first embodiment.

The area setting section 146 determines whether or not the shape determination section 130 has detected four sides of the screen 10 in the differential image (step S11). When the area setting section 146 has determined that the shape determination section 130 has not detected four sides of the screen 10 in the differential image, the area setting section 146 determines whether or not the shape determination section 130 has detected three sides of the screen 10 (step S12).

Figure 10:
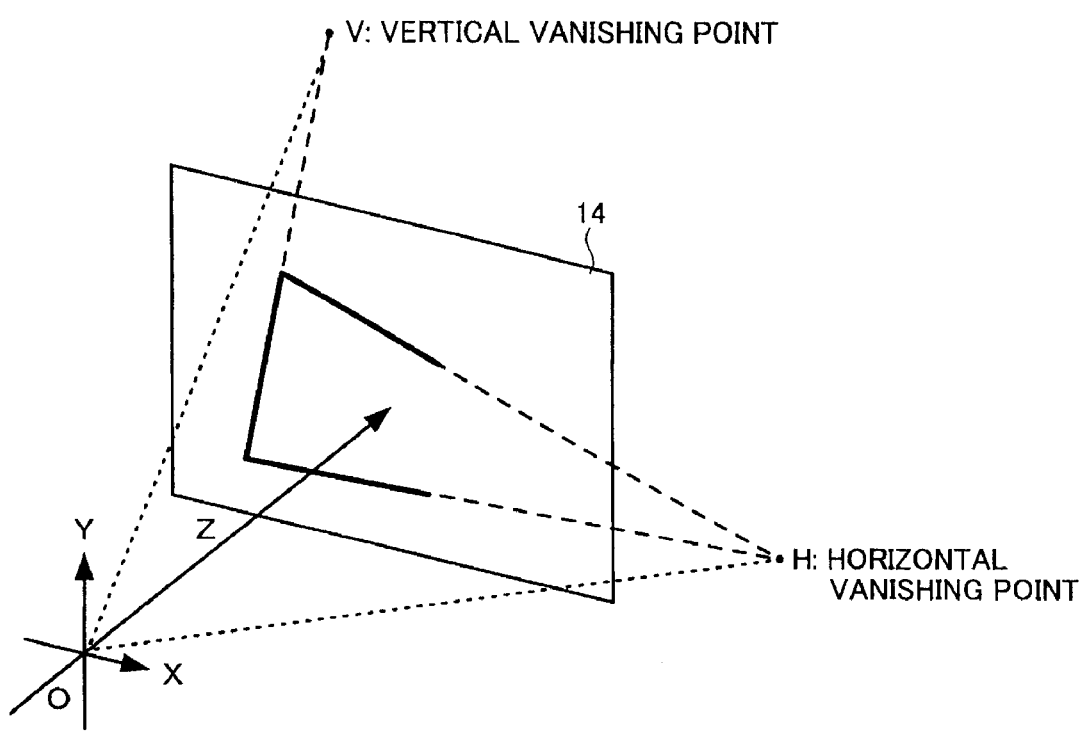
FIG. 10 is a diagram schematically showing a vertical vanishing point and a horizontal vanishing point.

FIG. 10 is a diagram schematically showing a vertical vanishing point V and a horizontal vanishing point H. In the example shown in FIG. 10, the shape determination section 130 has detected three sides (upper side, lower side, and left side) of the screen 10. When the shape determination section 130 has detected three sides of the screen 10, the area setting section 146 utilizes the vertical or horizontal vanishing point to determine the other vanishing point (step S13).

In the example shown in FIG. 10, the area setting section 146 sets a virtual projection plane 14 in a plane in which Z=1, and calculates the coordinate value of the horizontal vanishing point H at which the extensions of the upper side and the lower side of the screen 10 intersect.

The vertical vanishing point V is positioned on the extension of the left side, and an angle HOV formed by each vanishing point and the origin O is 90 degrees. The area setting section 146 calculates the coordinate value of the vertical vanishing point V at which the extensions of the left side and the right side of the screen 10 intersect utilizing these properties.

When the shape determination section 130 has not detected three sides of the screen 10, the area setting section 146 determines whether or not the shape determination section 130 has detected a vertical side (left side or right side) and a horizontal side (upper side or lower side) of the screen 10 (step S14). When the shape determination section 130 has detected the vertical side and the horizontal side of the screen 10, the area setting section 146 determines each vanishing point based on equations in which the vertical projection angle, the horizontal projection angle, and the roll angle are variables (step S15).

For example, when the vertical projection angle is referred to as $\theta$, the horizontal projection angle is referred to as $\phi$, and the roll angle is referred to as $\Psi$, the coordinate value (X, Y) of each vanishing point in the virtual projection plane 14 is expressed as follows.

$$\text{Vertical Vanishing Point } V = \left( \frac{\sin\psi\cos\phi}{\sin\psi\sin\phi\cos\theta + \cos\psi\sin\theta}, \frac{-\sin\psi\sin\phi\sin\theta + \cos\psi\cos\theta}{\sin\psi\sin\phi\cos\theta + \cos\psi\sin\theta} \right) \quad (1)$$

$$\text{Horizontal Vanishing Point } H = \left( \frac{\sin\psi\cos\phi}{\sin\psi\sin\phi\cos\theta - \sin\psi\sin\theta}, \frac{-\cos\psi\sin\phi\sin\theta - \sin\psi\cos\theta}{\cos\psi\sin\phi\cos\theta - \sin\psi\sin\theta} \right) \quad (2)$$

The basis for these equations is described later.

The term "vertical projection angle" used herein refers to the relative vertical angle formed by the screen 10 and the optical axis of projection light emitted from the projection section 190, for example. The term "horizontal projection angle" used herein refers to the relative horizontal angle formed by the screen 10 and the optical axis of projection light emitted from the projection section 190, for example. The vertical projection angle may be a value indicating the vertical slope of the projector 100 determined by the vertical projection angle determination section 180.

The area setting section 146 can solve the above equations as simultaneous equations of $\phi$ and $\Psi$ by substituting the value indicating the vertical slope of the projector 100 determined by the vertical projection angle determination section 180 for $\theta$ to determine the vertical vanishing point and the horizontal vanishing point.

When the shape determination section 130 has not detected the vertical side and the horizontal side of the screen 10, the area setting section 146 determines whether or not the shape determination section 130 has detected the upper side and the lower side of the screen 10 (step S16). When the shape determination section 130 has detected the upper side and the lower side of the screen 10, the area setting section 146 determines each vanishing point in the same manner as in the step S15 (step S17). Specifically, the area setting section 146 determines the horizontal vanishing point based on position information relating to the upper side and the lower side. The area setting section 146 can solve the above equations as simultaneous equations of $\phi$ and $\Psi$ by substituting the value indicating the vertical slope of the projector 100 determined by the vertical projection angle determination section 180 for $\theta$ to determine the vertical vanishing point.

When the shape determination section 130 has not detected the upper side and the lower side of the screen 10, the area setting section 146 determines whether or not the shape determination section 130 has detected the upper side or the lower side of the screen 10 (step S18). When the shape determination section 130 has detected the upper side or the lower side of the screen 10, the area setting section 146 determines each vanishing point using a method disclosed in JP-A-2006-60447 (step S19).

When the above conditions are not satisfied, the image generation section 150 generates an image which indicates that distortion of the image cannot be corrected based on the image information 122, and the projection section 190 projects the generated image (step S20). The projector 100 then finishes the distortion correction process.

When the area setting section 146 has determined each vanishing point is determined by the process in the step S13, S15, S17, or S19, the area setting section 146 supplements the missing side of the correction target area based on the known coordinate values of the screen 10 and the coordinate value of each vanishing point (step S21).

Figure 11:
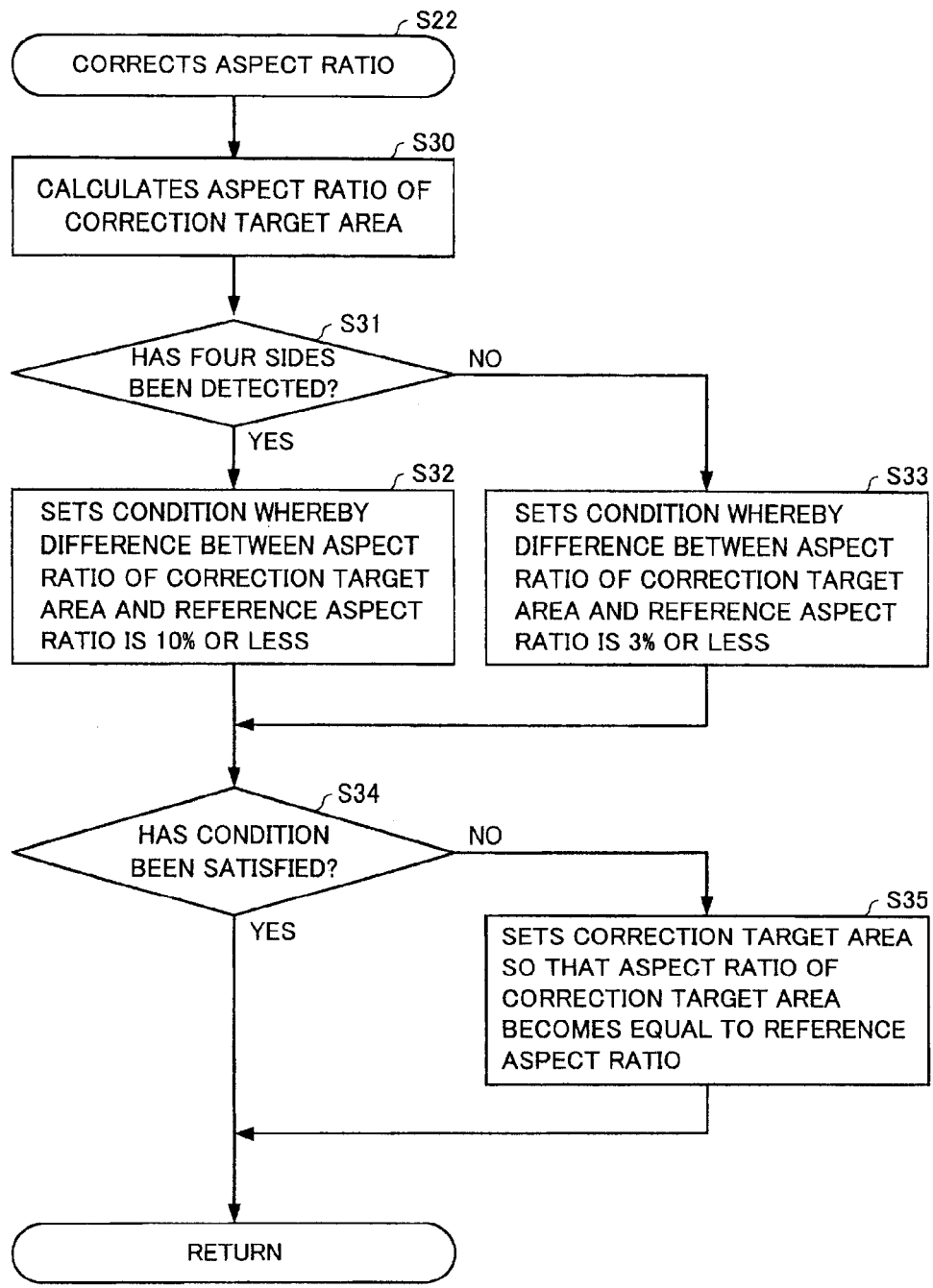
FIG. 11 is a flowchart showing an aspect ratio correction process according to the first embodiment of the invention.

The shape of the correction target area is determined by the above process. The area setting section 146 corrects the aspect ratio of the correction target area in a state in which the shape of the correction target area has been determined (step S22). This aspect ratio correction process is described below in detail. FIG. 11 is a flowchart showing the aspect ratio correction process according to the first embodiment.

The aspect ratio calculation section 170 calculates the aspect ratio of the correction target area determined by the area setting section 146 (step S30). The term "aspect ratio" used herein refers to a value obtained by dividing the length of the vertical side by the length of the horizontal side. For example, when the ratio of the length of the horizontal side to the length of the vertical side is 4:3, the aspect ratio is 0.75.

The determination section 172 determines whether or not the shape determination section 130 has detected the four sides of the screen 10 (step S31). When the determination section 172 has determined that the shape determination section 130 has detected the four sides of the screen 10, the determination section 172 sets a condition whereby the difference between the aspect ratio of the correction target area and the reference aspect ratio is 10% or less (step S32).

The term "reference aspect ratio" used herein refers to a desired aspect ratio set by the manufacturer or the user of the projector 100, for example. The reference aspect ratio is stored in the storage section 120 as reference data 126. For example, when the reference aspect ratio is 0.75, the above condition is satisfied when the aspect ratio of the correction target area is 0.675 or more and 0.825 or less.

When the determination section 172 has determined that the shape determination section 130 has not detected the four sides of the screen 10, the determination section 172 sets a condition whereby the difference between the aspect ratio of the correction target area and the reference aspect ratio is 3% or less (step S32). For example, when the reference aspect ratio is 0.75, the above condition is satisfied when the aspect ratio of the correction target area is 0.7275 or more and 0.7725 or less.

The determination section 172 determines whether or not the aspect ratio of the correction target area calculated by the aspect ratio calculation section 170 satisfies the set condition (step S34). When the aspect ratio of the correction target does not satisfy the condition, the determination section 172 sets the correction target area so that the aspect ratio of the correction target area becomes equal to the reference aspect ratio (step S35).

The determination section 172 outputs information which indicates the coordinate values of the four corners of the final correction target area on the liquid crystal panel to the image generation section 150. The image generation section 150 generates an image in the correction target area on the liquid crystal panel based on the received information and the image information 122 (step S8). The projection section 190 projects the generated image (step S9).

As described above, the projector 100 according to this embodiment can project an image at an aspect ratio corresponding to the situation by determining the value which indicates the difference between the aspect ratio of the correction target area and the reference aspect ratio satisfies the set condition, and projecting an image at an aspect ratio corresponding to the determination result.

Since the projector 100 according to this embodiment can determine the shape of at least part of the screen 10 based on the sensing information, distortion of an image can be accurately corrected without inputting operation information, whereby the projector 100 can project an image at the desired aspect ratio.

Since the projector 100 according to this embodiment can supplement an undetermined portion of the screen 10 even if the entire screen 10 is not included in the sensed image, the projector 100 can more generally project an image at an aspect ratio corresponding to the situation.

Since the projector 100 according to this embodiment can absorb a measurement error and the like by determining the difference in aspect ratio utilizing the range, a situation in which a non-display area occurs on the screen 10 can be prevented.

When the shape determination section 130 has not detected the shape of the entire screen 10, the projector 100 according to this embodiment reduces the determination range as compared with the case where the shape determination section 130 has detected the shape of the entire screen 10. Therefore, the projector 100 can more strictly deal with the case where distortion of an image occurs to a large extent, for example, whereby a situation in which an image having a wrong shape is projected can be prevented.

The projector 100 according to this embodiment can prevent a situation in which a non-display area occurs on the screen 10 by setting an area larger than the screen 10 by at least one pixel as the correction target area.

The projector 100 according to this embodiment can accurately correct distortion of an image, even if the projector 100 inclines with respect to the optical axis of projection light or the sensing section 110 is incorrectly provided, by determining the coordinate values of the vertical vanishing point and the horizontal vanishing point formed by the sides of the screen 10 in the coordinate system of the projection panel and supplementing a portion of the screen 10 which has not been determined by the shape determination section 130 based on the coordinate values.

The projector 100 according to this embodiment can accurately correct distortion of an image, even if the projector 100 inclines with respect to the optical axis of projection light, by performing calculations using the rotation angle of the projector 100 as a variable. Even if the projector 100 according to this embodiment cannot perform calculations using the rotation angle of the projector 100 as a variable, the projector 100 can correct distortion of an image by performing calculations in which the rotation angle is 0 degrees.

The projector 100 according to this embodiment can appropriately correct distortion of an image, even if the sensing section 110 is incorrectly provided, by setting the correction target area based on the coordinate values on the projection panel.

Calculation of Vanishing Point

The details of calculations of the vanishing points are given below. If the pitch angle $\theta$ and the yaw angle $\phi$ are fixed, the correction shape is not affected even if the screen 10 rotates in the roll direction. Therefore, the projector 100 is rotated in the order of the pitch angle $\theta$, the yaw angle $\phi$, and the roll angle $\Psi$.

A three-dimensional rotating matrix of the pitch angle $\theta$, the yaw angle $\phi$, and the roll angle $\Psi$ is expressed as follows (the pitch angle $\theta$ is the opposite direction (i.e., $-\theta$)).

$$\text{Rotating Matrix } R = \begin{pmatrix} \cos\psi & -\sin\psi & 0 \\ \sin\psi & \cos\psi & 0 \\ 0 & 0 & 1 \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} 1 & 0 & 0 \\ 0 & \cos\theta & \sin\theta \\ 0 & -\sin\theta & \cos\theta \end{pmatrix}$$

Therefore, the following equation is obtained.

$$R = \begin{pmatrix} \cos\psi\cos\phi & -\cos\psi\sin\phi\sin\theta - \sin\psi\cos\theta & \cos\psi\sin\phi\cos\theta - \sin\psi\sin\theta \\ \sin\psi\cos\phi & -\sin\psi\sin\phi\sin\theta + \cos\psi\cos\theta & \sin\psi\sin\phi\cos\theta + \cos\psi\sin\theta \\ -\sin\phi & -\cos\phi\sin\theta & \cos\phi\cos\theta \end{pmatrix}$$

This matrix indicates rotation when the projector 100 is viewed from the outside. The projector 100 rotates in the direction opposite to this matrix when viewed from the projector 100. Therefore, a coordinate transformation matrix which indicates rotation of the screen 10 viewed from the projector 100 is an inverse matrix of this matrix. Since a rotating matrix is one type of orthogonal matrix, the inverse matrix may be calculated by calculating the following transposed matrix.

$$\text{Transposed Matrix } R' = \begin{pmatrix} \cos\psi\cos\phi & \sin\psi\cos\phi & -\sin\phi \\ -\cos\psi\sin\phi\sin\theta - \sin\psi\cos\theta & -\sin\psi\sin\phi\sin\theta + \cos\psi\cos\theta & -\cos\phi\sin\theta \\ \cos\psi\sin\phi\cos\theta - \sin\psi\sin\theta & \sin\psi\sin\phi\cos\theta + \cos\psi\sin\theta & \cos\phi\cos\theta \end{pmatrix}$$

The vanishing point can be calculated by rotating the point at infinity [1:0:0] in the horizontal direction and the point at infinity [0:1:0] in the vertical direction before rotation using the transposed matrix R'. Specifically, the vertical vanishing point and the horizontal vanishing point perpendicularly intersect in a three-dimensional space. The normal to the screen 10 can be calculated by rotating the point at infinity [0:0:1] in the depth direction. Specific equations are as follows.

Vertical Vanishing Point V=[sin Ψ cos φ:−sin Ψ sin φ sin θ+cos Ψ cos θ:sin Ψ sin φ cos θ+cos Ψ sin θ]   (3)

Horizontal Vanishing Point H=[cos Ψ cos φ:−cos Ψ sin φ sin θ−sin Ψ cos θ:cos Ψ sin φ cos θ−sin Ψ sin θ]   (4)

Normal to screen 10=[−sin φ:−cos φ sin θ:cos φ cos θ]

[x:y:z] indicates a point (x, y, z) in projection geometry. The coordinate values of the vertical vanishing point V and the horizontal vanishing point H can be indicated by the equations (1) and (2) by dividing the three-dimensional coordinates of the vertical vanishing point V and the horizontal vanishing point H by the Z component.

The horizontal vanishing point can be calculated from the vertical vanishing point V and the horizontal side of the screen 10 according to the following calculations. The vertical vanishing point V and the horizontal vanishing point H perpendicularly intersect in a three-dimensional space, as described above. Therefore, when the vertical vanishing point V is indicated by [a:b:c], the horizontal vanishing point H should be positioned on a plane to which the normal is the vertical vanishing point V. Since the plane to which the normal is the vertical vanishing point V is expressed by ax+by+cz=0, the horizontal vanishing point H is positioned on a straight line expressed by ax+by+c=0 by substituting 1 for Z. Therefore, the horizontal vanishing point H is calculated as an intersection of the horizontal side and the straight line expressed by ax+by+c=0.

The vertical vanishing point V can be calculated from the vertical side and the horizontal side of the screen 10 and the vertical projection angle theta according to the following calculations. The equation of the left side or the right side is expressed by Ax+By+C=0, and the equation of the upper side or the lower side is expressed by Dx+Ey+F=0.

Substituting the equations of the vertical vanishing point V and the horizontal vanishing point H in the equations of the vertical side and the horizontal side and simplifying the equations yields the following equations.

0=A tan Ψ cos φ+B cos θ+C sin θ+(−B sin θ+C cos θ)tan Ψ sin φ

0=D cos φ−(E cos θ+F sin θ)tan Ψ+(−E sin θ+F cos θ)sin φ

Since the vertical projection angle θ can be obtained from the vertical projection angle determination section 180, unknown numbers included in these equations are φ and Ψ. Therefore, the vertical vanishing point V can be calculated.

The vertical vanishing point V can be calculated from the horizontal vanishing point H and the vertical projection angle θ according to the following calculations. Rotating the equations (3) and (4) with respect to the X axis using the vertical projection angle θ from the vertical projection angle determination section 180 yields the following equations:

Vertical Vanishing Point V'=[sin Ψ cos φ:cos Ψ:sin Ψ sin φ]

Horizontal Vanishing Point H'=[cos Ψ cos φ:−sin Ψ:cos Ψ sin φ]

Since the horizontal vanishing point H' is known, the component of the horizontal vanishing point H' rotated by the vertical projection angle θ can be calculated. In order to calculate the vertical vanishing point V' from the component of the horizontal vanishing point H', the component of the vertical vanishing point V' is multiplied by a constant to yield the following equation:

Vertical Vanishing Point V'=[cos φ:cos Ψ/sin Ψ:sin φ]=[cos Ψ cos φ:−sin Ψ(1/−sin Ψ):cos Ψ sin φ]

Therefore, the vertical vanishing point V' can be calculated from the horizontal vanishing point H' by substituting V'y=H'y−(1/H'y) for the Y component of this equation. After the vertical vanishing point V' has been calculated, the vertical vanishing point V can be calculated by rotating the vertical vanishing point V' by −θ around the X axis.

When calculating the vertical vanishing point V from only the vertical projection angle θ from the vertical projection angle determination section 180, the roll angle Ψ is set to be 0 degrees. The vertical vanishing point V equals (0, 1/tan θ) by substituting Ψ=0 in the equation (1) so that the vertical vanishing point V can be calculated from the vertical projection angle θ.

Second Embodiment

Figure 12:
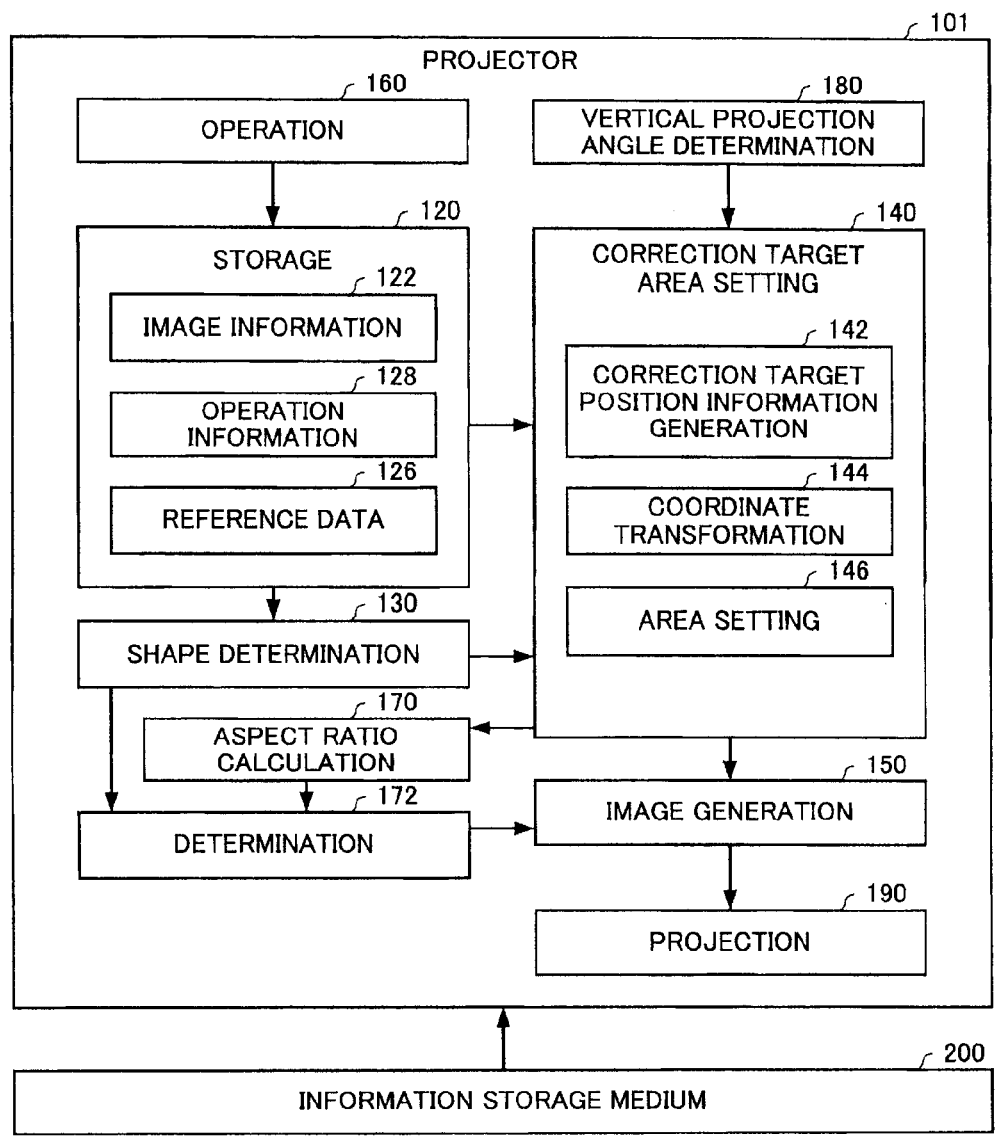
FIG. 12 is a functional block diagram of a projector according to a second embodiment of the invention.

FIG. 12 is a functional block diagram of a projector 101 according to a second embodiment. The projector 101 includes an operation section 160 which inputs user operation information 128 instead of the sensing section 110. The storage section 120 stores operation information 128 instead of the sensing information 124.

For example, when the use has performed an operation of moving four corners of the projected image 12 toward the four corners of the screen 10 using a remote controller, the operation section 160 inputs the operation information 128 which indicates the operation and stores the operation information 128 in the storage section 120. The shape determination section 130 determines the shape of the screen 10 based on the operation information 128, and the correction target area setting section 140 sets the correction target area based on the shape of the screen 10.

The projector 101 can accurately correct distortion of an image in the same manner as in the first embodiment without using the sensing information, as described above.

OTHER EMBODIMENTS

Application of the invention is not limited to the above embodiments. Various modifications and variations may be made. For example, the invention may be applied to position detection, image brightness correction, image color correction, and the like in addition to image distortion correction.

The condition value in the step S32 is not limited to 10%, and the condition value in the step S33 is not limited to 3%. An arbitrary value may be applied. The conditions in the steps S32 and S33 may be an identical condition. In the steps S32 to S34, the determination section 172 uses the differential value between the aspect ratio of the correction target area and the reference aspect ratio. Note that various values (e.g., ratio) which indicate a difference may be employed, for example.

In the above embodiments, an area is applied which is larger than the screen 10 by one pixel. Note that the area may coincide with the screen 10, or may be larger than the screen 10 by two or more pixels. The area may be determined based on the ratio of the number of pixels of the liquid crystal panel and the number of pixels of the sensing area.

When the projectors 100 and 101 have a zoom function, the projectors 100 and 101 may correct an image depending on the zoom state. The differential image between the sensed images is used in the above embodiments. Note that the sensed images 400 and 401 may be directly used. The calibration image is not limited to the calibration images 300 to 302 described above. For example, the projectors 100 and 101 may use only the calibration image 300 or the calibration image 301, or may use a white and black checkered calibration image instead of the calibration image 301.

The projection target is not limited to the screen 10. Various projection targets having a rectangular projection target area (e.g., whiteboard, blackboard, or rectangular frame provided on a wall) may be used. As the projectors 100 and 101, a liquid crystal projector, a cathode ray tube (CRT) projector, a projector using a digital micromirror device (DMD), or the like may be used. DMD is a trademark of Texas Instruments, Inc. (U.S.A.).

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A projector comprising:
   a projection section which projects a calibration image onto a projection target;
   a shape determination section which determines at least part of a shape of the projection target based on sensing information from a sensing section or operation information from an operation section;
   a correction target area setting section which sets a correction target area, the correction target area being an area along the shape determined by the shape determination section;
   an aspect ratio calculation section which calculates an aspect ratio of the correction target area;
   a determination section which determines whether or not the aspect ratio is appropriate based on a first criterion when the shape determination section has determined the shape of the entire projection target, and determines whether or not the aspect ratio is appropriate based on a second criterion which is stricter than the first criterion when the shape determination section has not determined the shape of the entire projection target; and
   an image generation section which generates an image having the shape of the correction target area on a projection panel when the aspect ratio is appropriate, and generates an image having a reference aspect ratio on the projection panel when the aspect ratio is inappropriate.

2. The projector as defined in claim 1,
   wherein the sensing section senses an area including at least part of the calibration image projected by the projection section and at least part of the projection target to generate the sensing information which indicates a sensed image; and
   wherein the shape determination section determines the shape of at least part of the projection target included in the sensed image based on the sensing information.

3. The projector as defined in claim 1,
   wherein, when the shape of the entire projection target has not been determined by the shape determination section, the correction target area setting section determines coordinate values of a vertical vanishing point and a horizontal vanishing point formed by sides of the projection target in a coordinate system of the projection panel based on the sensing information, and supplements a portion of the projection target which has not determined by the shape determination section based on the coordinate values.

4. The projector as defined in claim 1,
   wherein the determination section determines whether or not the aspect ratio is adequate by determining whether or not a value which indicates the difference between the aspect ratio of the correction target area and the reference aspect ratio is within a predetermined range.

5. The projector as defined in claim 4,
   wherein, when the shape of the entire projection target has not been determined by the shape determination section, the determination section reduces the predetermined range as compared with the case where the shape of the entire projection target has been determined by the shape determination section.

6. The projector as defined in claim 1,
   wherein the correction target area setting section sets an area larger than the shape determined by the shape determination section by at least one pixel as the correction target area.

7. A projected image adjustment method using a projector, the method comprising causing the projector to:
   project a calibration image onto a projection target;
   determine a shape of at least part of the projection target based on sensing information from a sensing section or operation information from an operation section;
   set a correction target area, the correction target area being an area along the determined shape;
   calculate an aspect ratio of the correction target area;
   determine whether or not the aspect ratio is appropriate based on a first criterion when the shape of the entire projection target has been determined, and determine whether or not the aspect ratio is appropriate based on a second criterion which is stricter than the first criterion when the shape of the entire projection target has not been determined;
   generate an image having the shape of the correction target area on a projection panel when the set condition is satisfied, and generate an image having a reference aspect ratio on the projection panel when the aspect ratio is inappropriate; and
   project the image generated on the projection panel.

8. The method as defined in claim 7,
   wherein the projector senses an area including at least part of the calibration image projected by the projection section and at least part of the projection target to generate sensing information which indicates a sensed image, and determines at least part of the shape of the projection target included in the sensed image based on the sensing information.

9. The method as defined in claim 7,
   wherein, when the shape of the entire projection target has not been determined, the projector determines coordinate values of a vertical vanishing point and a horizontal vanishing point formed by sides of the projection target in a coordinate system of the projection panel based on the sensing information, and supplements a portion of the projection target which has not determined based on the coordinate values.

10. The method as defined in claim 7,
    wherein the projector determines whether or not the aspect ratio is adequate by determining whether or not a value which indicates the difference between the aspect ratio of the correction target area and the reference aspect ratio is within a predetermined range.

11. The method as defined in claim 10,
    wherein, when the entire shape of the projection target has not been determined, the projector reduces the predetermined range as compared with the case where the entire shape of the projection target has been determined.

12. The method as defined in claim 7,
wherein the projector sets an area larger than the determined shape by at least one pixel as the correction target area.

13. A program readable by a computer included in a projector including a projection section, the program causing the computer to function as:
a projection control section which causes a projection section to project a calibration image onto a projection target;
a shape determination section which determines at least part of a shape of the projection target based on sensing information from a sensing section or operation information from an operation section;
a correction target area setting section which sets a correction target area, the correction target area being an area along the shape determined by the shape determination section;
an aspect ratio calculation section which calculates an aspect ratio of the correction target area;
a determination section which determines whether or not the aspect ratio is appropriate based on a first criterion when the shape determination section has determined the shape of the entire projection target, and determines whether or not the aspect ratio is appropriate based on a second criterion which is stricter than the first criterion when the shape determination section has not determined the shape of the entire projection target; and
an image generation section which generates an image having the shape of the correction target area on a projection panel when the aspect ratio is appropriate and generates an image having a reference aspect ratio on the projection panel when the aspect ratio is inappropriate.

* * * * *

UNITED STATES PATENT AND TRADEMARK OFFICE
CERTIFICATE OF CORRECTION

| | | |
|---|---|---|
| PATENT NO. | : 8,177,373 B2 | Page 1 of 1 |
| APPLICATION NO. | : 13/180650 | |
| DATED | : May 15, 2012 | |
| INVENTOR(S) | : Shiki Furui | |

It is certified that error appears in the above-identified patent and that said Letters Patent is hereby corrected as shown below:

Title Page (*) Notice

Please add:

--This patent is subject to a Terminal Disclaimer.--

Signed and Sealed this
Twenty-eighth Day of August, 2012

David J. Kappos
*Director of the United States Patent and Trademark Office*